(12) United States Patent
Park et al.

(10) Patent No.: US 8,277,067 B2
(45) Date of Patent: Oct. 2, 2012

(54) LIGHT SOURCE MODULE, METHOD OF MANUFACTURING THE SAME AND BACKLIGHT ASSEMBLY HAVING THE SAME

(75) Inventors: Se-Ki Park, Suwon-si (KR); Gi-Cherl Kim, Yongin-si (KR); Young-Keun Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 487 days.

(21) Appl. No.: 12/551,843

(22) Filed: Sep. 1, 2009

(65) Prior Publication Data
US 2009/0316389 A1   Dec. 24, 2009

(51) Int. Cl.
*G09F 13/04*   (2006.01)
*G09F 13/08*   (2006.01)

(52) U.S. Cl. .................. 362/97.3; 362/249.02; 362/555; 362/800; 362/630; 362/612; 362/97.1; 174/260

(58) Field of Classification Search .................. 362/800, 362/630–633, 612–613, 97.1–97.3, 311.02, 362/555, 249.02; 174/250–268
See application file for complete search history.

(56) References Cited

U.S. PATENT DOCUMENTS

| | | | | |
|---|---|---|---|---|
| 7,481,553 B2* | 1/2009 | Kim et al. | | 362/240 |
| 7,530,711 B2* | 5/2009 | Bang | | 362/241 |
| 7,967,490 B2* | 6/2011 | Kim et al. | | 362/612 |
| 8,009,245 B2* | 8/2011 | Kim et al. | | 349/65 |
| 8,157,400 B2* | 4/2012 | Gomi et al. | | 362/97.3 |
| 8,157,430 B2* | 4/2012 | Hamada | | 362/613 |
| 2006/0139932 A1* | 6/2006 | Park | | 362/294 |
| 2006/0289201 A1* | 12/2006 | Kim et al. | | 174/261 |
| 2007/0030697 A1* | 2/2007 | Kim | | 362/618 |
| 2009/0109668 A1* | 4/2009 | Isobe | | 362/231 |
| 2009/0283790 A1* | 11/2009 | Tsou | | 257/99 |

FOREIGN PATENT DOCUMENTS

JP    2007288194 A   * 11/2007

* cited by examiner

*Primary Examiner* — Anne Hines
*Assistant Examiner* — Jose M Diaz
(74) *Attorney, Agent, or Firm* — Innovation Counsel LLP

(57) ABSTRACT

In accordance with one or more embodiments of the present invention, a light source module includes a light source, a frame plate, and an insulation structure. The frame plate includes a plurality of light source pad portions, a power wiring portion, and a peripheral portion. The power wiring portion is electrically connected to the light source to be formed in the vicinity of the light source pad portion. A boundary area of the power wiring portion corresponding to the peripheral portion and the light source pad portion is formed to be open, so that the power wiring portion is spaced apart from the peripheral portion and the light source pad portion. The insulation structure is formed in the boundary area to electrically insulate the power wiring portion from the frame plate. In one aspect, the volume, weight, and manufacturing costs of the light source module may be reduced, and a process of individually packaging light sources may be considered unnecessary.

20 Claims, 15 Drawing Sheets

US 8,277,067 B2

LIGHT SOURCE MODULE, METHOD OF MANUFACTURING THE SAME AND BACKLIGHT ASSEMBLY HAVING THE SAME

CROSS REFERENCE TO RELATED APPLICATIONS

This application claims priority to and benefit of Korean Patent Application No. 2008-105293, filed on Oct. 27, 2008, in the Korean Intellectual Property Office (KIPO), the contents of which are herein incorporated by reference in their entirety.

BACKGROUND

1. Technical Field

Example embodiments of the present invention generally relate to a light source, a method of manufacturing the light source, and a backlight assembly having the light source and, for example, relate to a light source, such as using a light-emitting diode (LED), a method of manufacturing the light source (e.g., LED), and a backlight assembly providing a rear light to a flat panel display device using the light source (e.g., LED).

2. Related Art

Generally, a liquid crystal display (LCD) device includes a backlight assembly providing a display panel with a backlight. Cold cathode fluorescent lamps (CCFLs) and light-emitting diodes (LEDs) are widely used as light sources for backlight assemblies. LEDs have low power consumption, high color reproducibility, long lifetimes and fast response times, and thus, the LEDs are being used as a next-generation light source.

In a backlight assembly using LEDs with circuit wiring configured to illuminate the LEDs, various types of printed circuit boards (PCBs) have been used. However, the number of manufacturing processes has increased due to a packaging process in which the LEDs are manufactured in a separate process, and manufacturing time has increased due to a process of electrically connecting the LEDs to each other. Moreover, damage often occurs in the manufacturing process due to heat and stress exerted on an electrical connection portion of the LEDs. Furthermore, as the PCB has increased manufacturing costs, the manufacturing costs of the PCB module may be increased.

SUMMARY

Example embodiments of the present invention may provide a light source module having decreased size, decreased weight, and/or a simple power supplying structure by using an additional member that is used in a manufacturing process.

Example embodiments of the present invention also provide a method of manufacturing the above-mentioned light module.

Example embodiments of the present invention also provide a backlight assembly having the above-mentioned light module.

According to an embodiment of the present invention, a light source module includes a light source, a frame plate, and an insulation structure. The frame plate includes a plurality of light source pad portions, a power wiring portion, and a peripheral portion. The light source pad portions have the light source disposed thereon. The power wiring portion is electrically connected to the light source to be formed in the vicinity of the light source pad portion. The peripheral portion is a remaining portion excluding the light source pad portion and the power wiring portion. A boundary area of the power wiring portion corresponding to the peripheral portion and the light source pad portion is formed to be open, so that the power wiring portion is spaced apart from the peripheral portion and the light source pad portion. The insulation structure is formed in the boundary area. The insulation structure electrically insulates the power wiring portion from the frame plate.

In an example embodiment of the present invention, the frame plate may have a conductive plate. The insulation structure may be a plastic injection molding material which is injected in the boundary area. The plastic injection molding material may be penetrated through a first surface of the frame plate and a second surface opposite to the first surface. A portion of the power wiring portion may be removed in a thickness direction to have a smaller thickness than that of the peripheral portion, and the insulation structure may surround the power wiring portion to be formed to be level with respect to the peripheral portion. The light source pad may be formed on the first surface, and a heat radiating surface exposed by the insulation structure may be further formed on the second surface.

In an example embodiment of the present invention, the light source may include at least one light-emitting diode (LED). A plurality of the LEDs may be grouped into at least one group, and each group of the LEDs may be electrically connected to each other by the power wiring portions. A power input portion and a power output portion may be formed at an input side power wiring portion and an output side power wiring portion of each of the groups, respectively. Alternatively, a plurality of coupling holes may be formed through the frame plate, an input pad exposing the coupling hole may be formed through an end portion of the input side power wiring portion of each of the groups extended to the coupling hole, and an output pad exposing the coupling hole may be formed through an end portion of the output side power wiring portion of each of the groups extended to the coupling hole.

According to another embodiment of the present invention, a backlight assembly includes a light source, a frame plate, a light source module, and a receiving container. The frame plate includes a plurality of light source pad portions, a power wiring portion, and a peripheral portion. The light source pad portions have the light source disposed thereon. The power wiring portion is electrically connected to the light source to be formed in the vicinity of the light source pad portion. The peripheral portion is a remaining portion excluding the light source pad portion and the power wiring portion. A boundary area of the power wiring portion corresponding to the peripheral portion and the light source pad portion is formed to be open, so that the power wiring portion is spaced apart from the peripheral portion and the light source pad portion. The insulation structure is formed in the boundary area. The insulation structure electrically insulates the power wiring portion from the frame plate.

In an example embodiment of the present invention, the backlight assembly may, include an insulation sheet. The insulation sheet may be disposed between the bottom plate and the second surface of the frame plate. The insulation sheet may radiate heat generated from the light source and may insulate the frame plate from the bottom plate. The light source pad may be formed on the first surface. A heat radiating surface, which is exposed by the insulation structure to contact the insulation sheet, may be, formed on the second surface corresponding to the light source pad. The light source may include at least one LED. A plurality of the LEDs may be grouped into at least one group. Each group of the LEDs is serially connected to each other by the power wiring portions, and the light source modules may be arranged on the bottom plate. The backlight assembly may include a power delivery substrate. The power delivery substrate may electrically connect to a converter providing the light source with driving power and the light source module. The power delivery substrate may be disposed on a bottom plate between the light source modules. The bottom plate may be divided into a plurality of receiving areas where each of the light source modules is disposed. The bottom plate between the receiving areas may be protruded toward an upper side to form a stepped portion, and the power delivery substrate may be disposed on an upper surface of the stepped portion. A power input portion and a power output portion that are protruded from an edge of the frame plate may be formed in an input side power wiring portion of each of the groups and an output side wiring portion of each of the groups, respectively. The power input portion and the power output portion may be extended over the power delivery substrate to be electrically connected to a power connection terminal of the power delivery substrate. Alternatively, a plurality of coupling holes through which a coupling member coupled with the bottom plate is inserted may be further formed through the frame plate. Each end portion of the input side power input portion and the output side power output portion may be extended to the coupling hole. The backlight assembly may include a power connection wiring being pressed by the coupling member to contact the end portions so that the power connection wiring electrically connects to the power delivery substrate and the light source module.

According to still another embodiment of the present invention, there is provided a method of manufacturing a semiconductor device. In the method, a boundary area between a power wiring area and a peripheral area that are defined on a conductive plate is formed to be open to form a frame plate in which a power wiring portion corresponding to the power wiring area is spaced apart from a peripheral portion corresponding to the peripheral area. Then, an insulation structure is formed on the open boundary area. Then, a light source is mounted on the frame plate to be electrically connected to the frame plate and the power wiring portion.

In an example embodiment of the present invention, a light source pad portion having the light source disposed thereon may be formed on the conductive plate. The light source pad part may be electrically insulated from the power wiring portion. The forming of the insulation structure may include disposing the conductive plate at an injector, filling up the boundary area with a plastic injection molding material, and hardening the plastic injection molding material. A supporting portion connecting the power wiring portion and the conductive plate may be removed after forming the insulation structure. The mounting of the light source on the frame plate may include disposing a light-emitting substance on the light source pad and electrically connecting end portions of the power wiring portions formed in the vicinity of the light source pad to an input terminal and output terminal of the light-emitting substance.

According to a light source module, a method of manufacturing the light source module, and a backlight assembly having the light source module in accordance with example embodiments of the present invention, a lead frame used in a manufacturing process of a light source, such as an LED, is changed into a power delivery means, so that a printed circuit board (PCB) may be omitted. Thus, the volume, weight, and manufacturing costs of the light source module may be reduced and a process of individually packaging light sources may be omitted, so that manufacturing efficiency may be enhanced.

BRIEF DESCRIPTION OF THE DRAWINGS

The above and other features and advantages of embodiments of the present invention will become more apparent by describing in detailed example embodiments thereof with reference to the accompanying drawings, in which.

DETAILED DESCRIPTION

Figure 1:
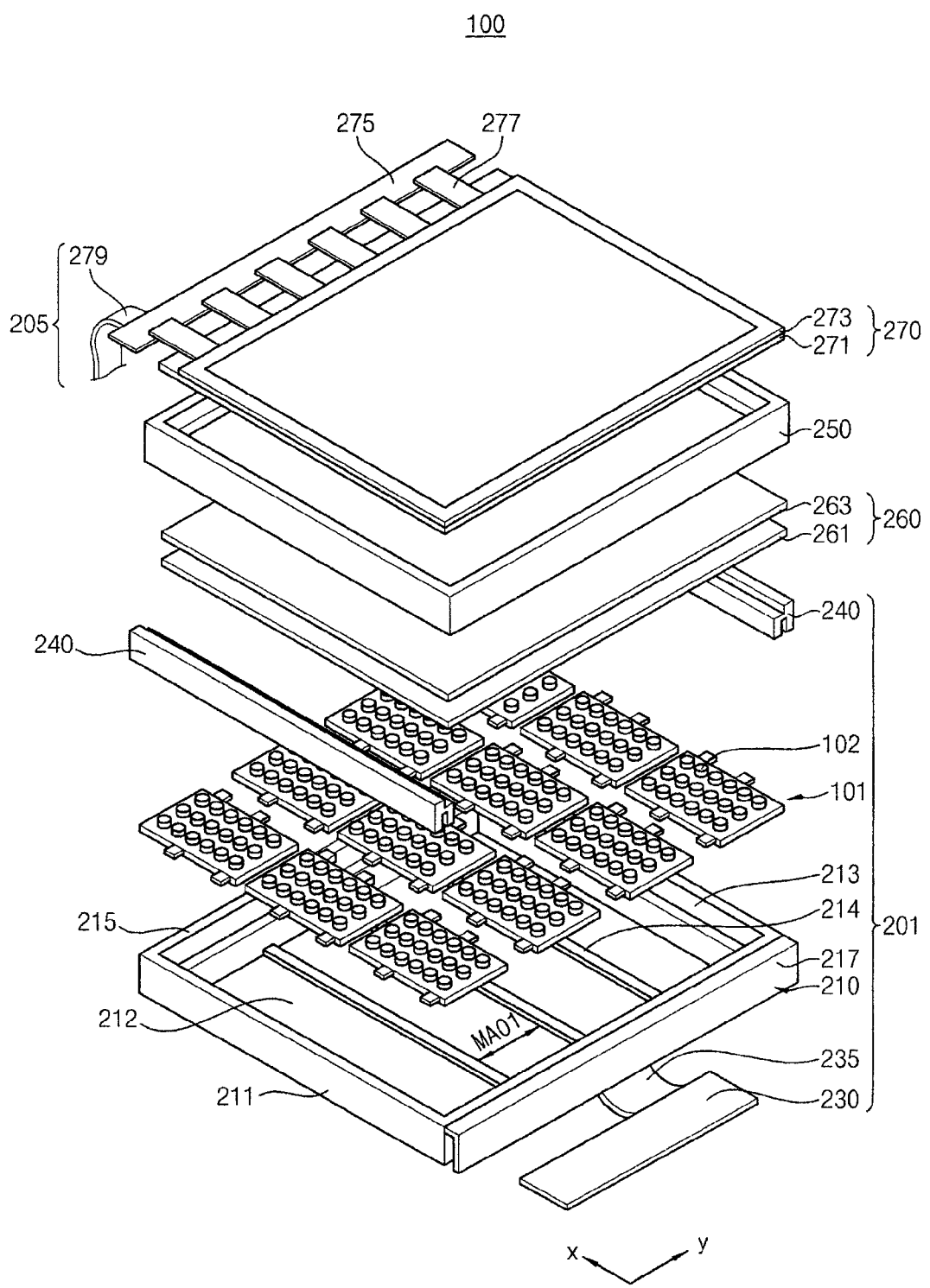
FIG. 1 is an exploded perspective view schematically illustrating a display device according to Example Embodiment 1.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below" "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Example Embodiment 1

Figure 2:
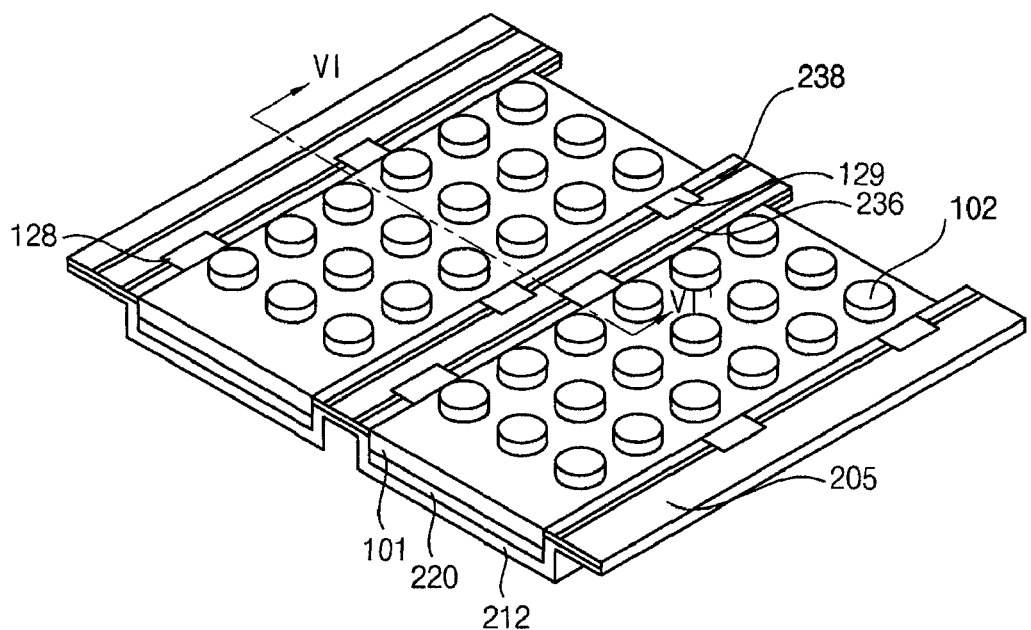
FIG. 2 is a perspective view illustrating a combination of a light source module and the receiving container illustrated in FIG. 1, in accordance with an embodiment of the present invention.

FIG. 1 is an exploded perspective view schematically illustrating a display device 100 employing a backlight assembly 201 according to an Example Embodiment 1. FIG. 2 is a perspective view illustrating a combination of a light source module 101 and the receiving container 210 illustrated in FIG. 1, in accordance with an embodiment.

Referring to FIGS. 1 and 2, the display device 100 includes a display panel assembly 205 and the backlight assembly 201. The display panel assembly 205 may include a liquid crystal display (LCD) panel 270 and a driving board 275. The LCD panel 270 may include an array substrate 271, an opposite substrate 273 and a liquid crystal layer (not shown) interposed between the array substrate 271 and the opposite substrate 273. The driving board 275 transmits a panel driving signal driving the LCD panel 270 to the LCD panel 270 based on an image signal received from an external device (not shown). The LCD panel 270 is electrically connected to the driving board 275 through a signal transmission film 277.

The backlight assembly 201 of the present embodiment emits light to a rear surface of the LCD panel 270 to display an image. The LCD panel 270 displays images based on the light and the panel driving signal. The backlight assembly 201 includes a receiving container 210 and a plurality of light source modules 101. In the backlight assembly 201 of the present embodiment, the number of elements, the volume, and weight of the light source module 101 may be reduced due to technical characteristics of the light source module 101.

The receiving container 210 includes a bottom plate 212, a first side wall 211, a second side wall 213, a third side wall 215, and a fourth side wall 217. The first to fourth side walls 211, 213, 215 and 217 may be extended from four sides of the bottom plate 212 of a substantially rectangular shape. The first and second side walls 211 and 213 may be disposed to face each other, and the third and fourth side walls 215 and 217 may be disposed to face each other. The receiving container 210 may include a metal material.

A short side direction of the bottom plate 212 is defined as a vertical direction 'x', and a long side direction of the bottom plate 212 is defined as a lateral direction 'y'. In the present embodiment, a plurality of module receiving areas MA01, in which the light source modules 101 are disposed, is defined in the bottom plate 212. A plurality of stepped portions 214 extended in the vertical direction 'x' is formed in the bottom plate 212 at predetermined intervals. The module receiving area MA01 is classified by the stepped portions 214.

The light source module 101 emits light by driving power transmitted from an external device (not shown) to output the light to a rear surface of the LCD panel 270. A plurality of the light source modules 101 may be disposed in the module receiving area MA01 illustrated in FIGS. 1 and 2.

The light source module 101 of the present embodiment may include a point light source 102, such as a light-emitting diode (LED). In the present embodiment, a lead frame used in a manufacturing process of the LED is not discarded, and the lead frame is formed to have a power transmission wiring so that the light source module 101 is formed.

Hereinafter, a method of manufacturing the light source module 101 and the light source module 101 are described.

Figure 3:
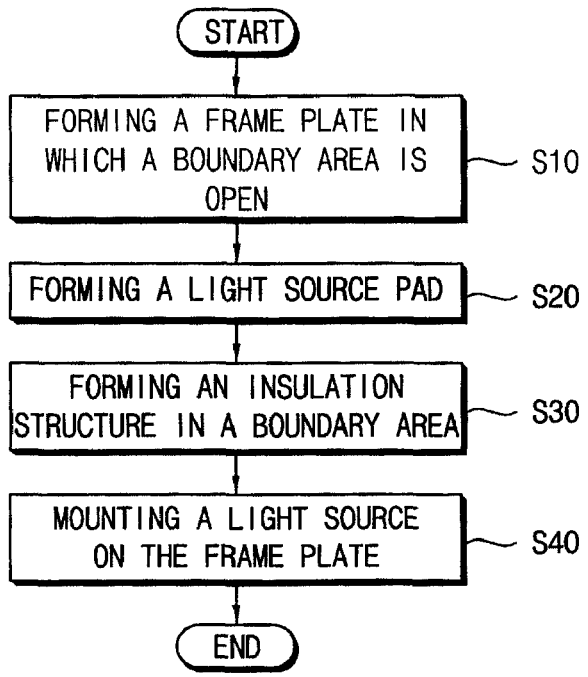
FIG. 3 is a flowchart illustrating a method of manufacturing a light source module illustrated in FIG. 1, in accordance with an embodiment of the present invention.
Figure 4:
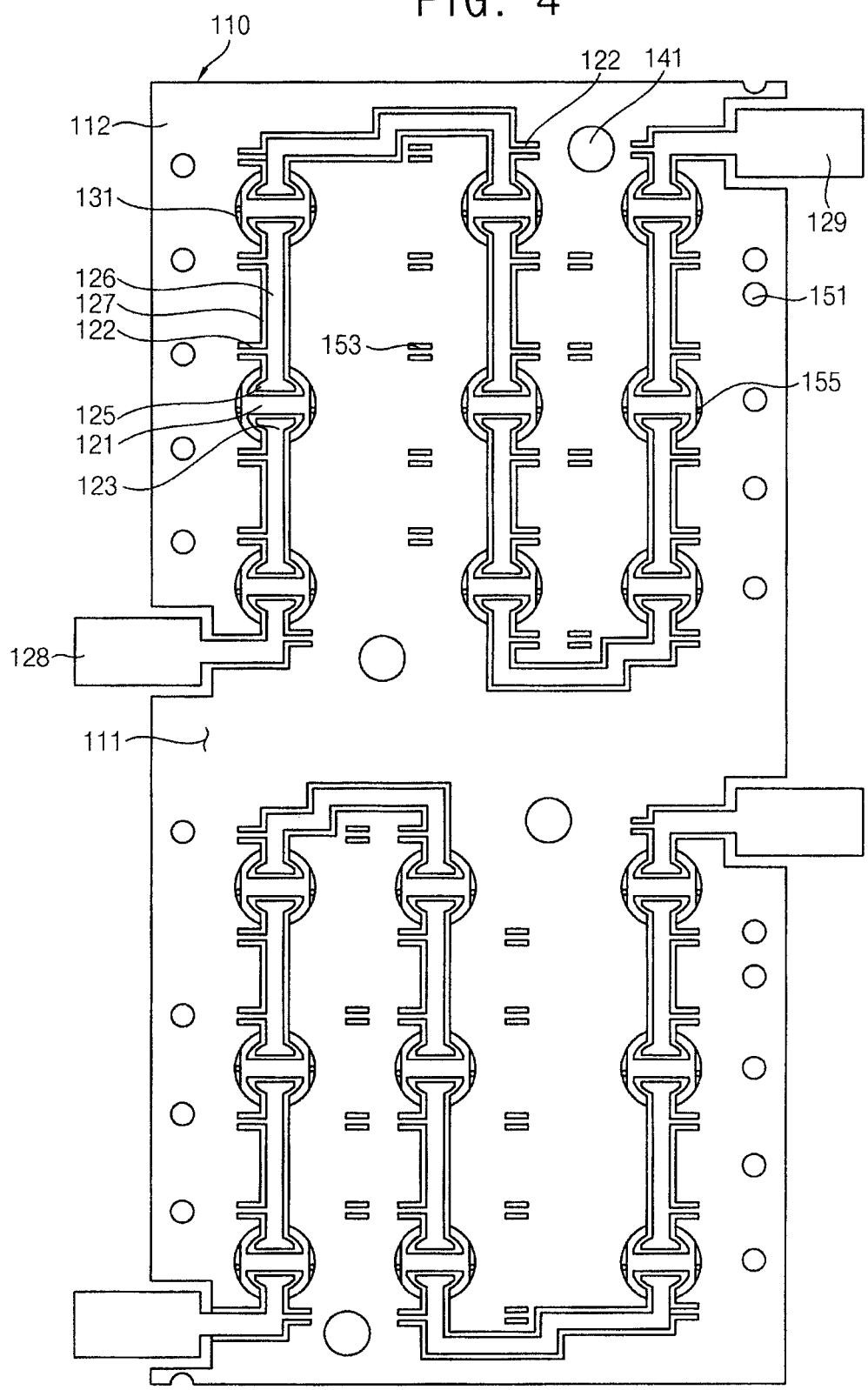
FIG. 4 is a front view of a frame plate of a light source module illustrated in FIG. 1, in accordance with an embodiment of the present invention.

FIG. 3 is a flowchart illustrating a method of manufacturing a light source module 101 illustrated in FIG. 1, in accordance with an embodiment of the present invention. FIG. 4 is a front view of a frame plate 110 of a light source module 101 illustrated in FIG. 1, in accordance with an embodiment of the present invention.

Referring to FIGS. 3 and 4, in a method of manufacturing the light source module 101, a frame plate 110 is formed (block S10). As such, a conductive plate, such as a copper plate or an aluminum plate, having a thickness of about 1 mm may be prepared. The conductive plate is disposed in a molding process forming a wiring pattern. Then, the mold process stamps the conductive plate to form the frame plate 110 illustrated in FIG. 4.

A light source pad area, a power wiring area, a peripheral area, and a boundary area 127 are defined on the conductive plate. The boundary area 127 is defined as a boundary where the power wiring area is formed with respect to the light source pad area and the peripheral area. The boundary area 127 is formed to be open by a mold press process. In one aspect, a power wiring portion 126 corresponding to the power wiring area is spaced apart from a peripheral portion 112 corresponding to the peripheral area. Thus, a frame plate 110 is formed.

A plurality of light source pads 121 on which light sources are to be disposed is formed on an upper surface 111 of the frame plate 110, and the light source pads 121 are arranged in a matrix shape (block S20). In the present embodiment, the number of the light source pads 121 is eighteen. As such, six light source pads 121 may be arranged in the vertical direction 'x' and three light source pads 121 are arranged in the lateral direction 'y'. The number of the light source pads 121 and the arrangement type may be modified in various ways.

The open boundary area 127 is, as shown in FIG. 4, extended from the vicinity of a first side edge of the light source pad 121 to the vicinity of a second side edge of the light source pad 121 neighboring the light source pad 121. The boundary areas 127 are formed along a circuit line pattern designed to drive the light source module 101. The power wiring portion 126 becomes spaced apart from the peripheral area 112, and the light source pad 121 as the boundary area 127 becomes more open. In the mold press process, the power wiring portion 126 may not be fully separated from the peripheral portion 112. A plurality of supporting portions 122 is protruded from a side surface of the power wiring portion 126 to be connected to a side surface of the frame plate 110 formed by the boundary area 127. The supporting portion 122 may be removed in a following process.

A first pad 123 is formed at a first side end portion of the power wiring portion 126, and a second pad 125 is formed at a second side end portion of the power wiring portion 126. The first pad 123 may be disposed at the first side edge of the light source pad 121. For example, the vicinity of an input side of the light source pad 121. The second pad 125 may be disposed at the second side edge of another light source pad 121. For example, the vicinity of an output side of another light source pad 121. The light source pads 121 are grouped into two groups of three rows and three columns for a total of nine per group, and the light source pads 121 within each group are sequentially arranged along the power wiring portion 126.

In the mold press process for the conductive plate, the power input portion 128 may be formed with the power output portion 129. In the present embodiment, the power input portion 128 is extended from the power wiring portion 126 of a first side end terminal receiving driving power of the light source among the power wiring portions 126, which serially arrange the light source pads 121, to be protruded from a first side edge of the frame plate 110. The power output portion 129 is extended from the power wiring portion 126 of a second side end terminal outputting the driving power and protrudes from a second side edge of the frame plate 110.

In the mold press process, a coupling hole 141, an alignment hole 151, etc., may be formed through the frame plate 110. The coupling hole 141 may be used when the light source module 101 is fixed to the bottom plate 212 by a screw. The alignment holes 151 and 153 may be used for an alignment during a following process in which the frame plate 110 is used.

Figure 5:
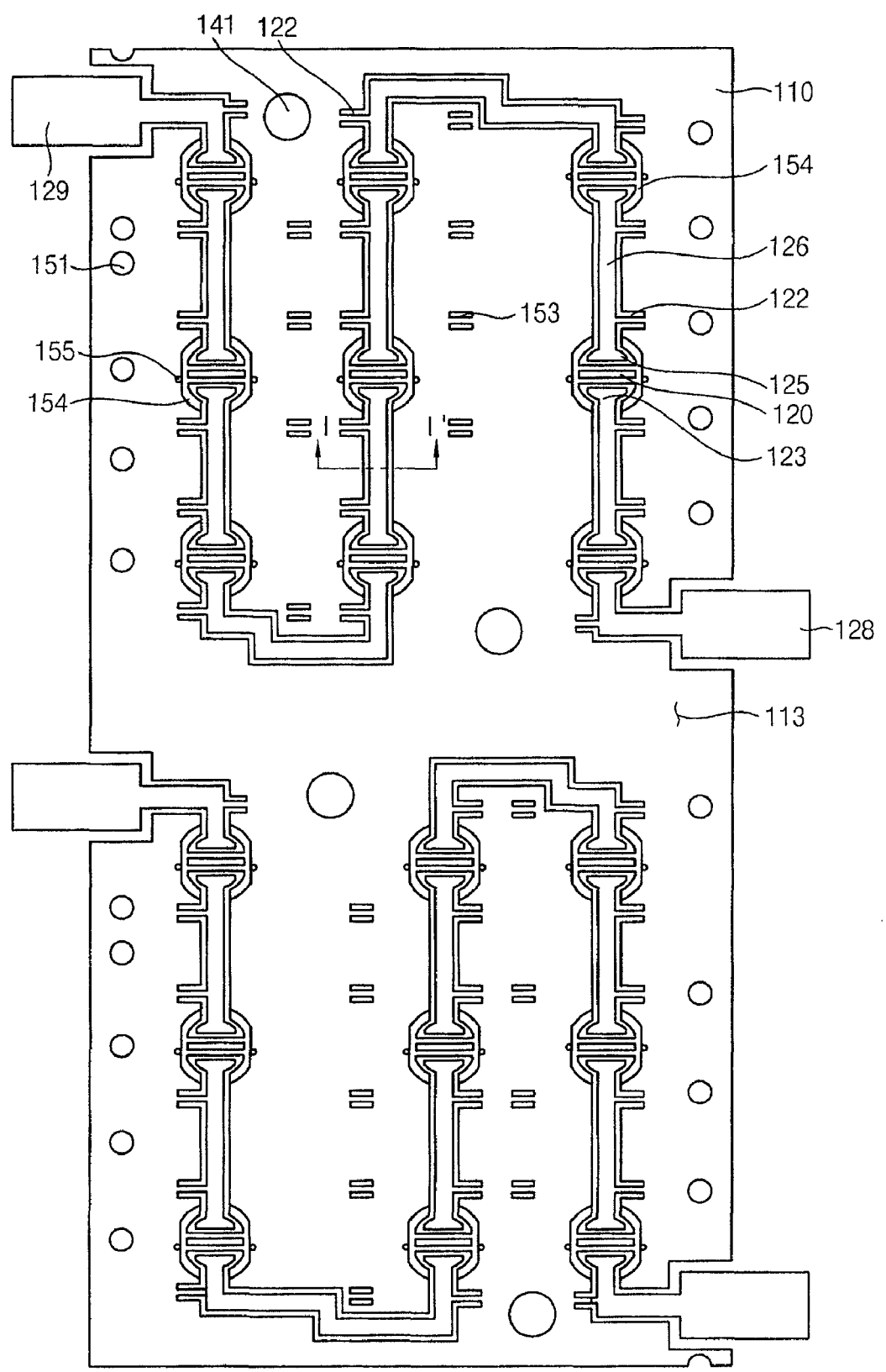
FIG. 5 is a rear view illustrating the frame plate illustrated in FIG. 4, in accordance with an embodiment of the present invention.
Figure 6:
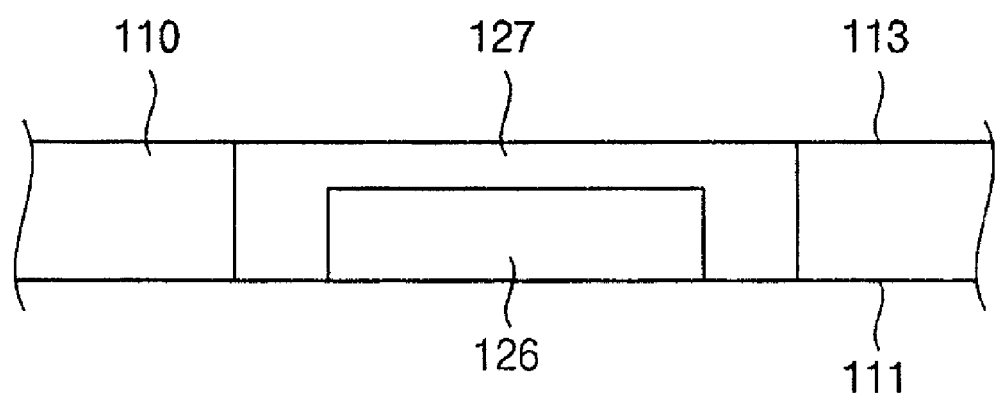
FIG. 6 is a cross-sectional view taken along a line I-I' of the frame plate illustrated in FIG. 5, in accordance with an embodiment of the present invention.

FIG. 5 is a rear view illustrating the frame plate 110 illustrated in FIG. 4, in accordance with an embodiment of the present invention. FIG. 6 is a cross-sectional view taken along a line I-I' of the frame plate 110 illustrated in FIG. 5, in accordance with an embodiment of the present invention.

Referring to FIGS. 5 and 6, a portion of a lower surface of the power wiring portion 126 is removed in a thickness direction. For example, a portion of the power wiring portion 126 may be etched in the thickness direction. When the thickness of the power wiring portion 126 is about 1 mm, the power wiring portion 126 is etched by a depth of about 0.4 mm. A photoresist layer exposing the power wiring portion 126 is formed on the lower surface 113 of the frame plate 110, and the frame plate 110 having the photoresist layer is exposed and developed to partially etch the power wiring portion 126.

In the etching process, a lower surface edge recess 154 may be formed. The lower surface edge recess 154 may be formed through the lower surface 113 of the frame plate 110 in correspondence with the light source pad 121. A heat radiating surface 120 is formed within the lower edge recess 154. The heat radiating surface 120 corresponds to a center portion of the light source pad 121 to have a height that is the same as the height of the frame plate 110 with respect to the upper surface 511.

As shown in FIG. 4, an upper surface edge recess 131 is formed along around the light source pad 121 in the upper surface 111 of the frame plate 110. The area surrounding the light source pad 121 may be partially etched through the etching process, and the upper surface edge recess 131 may also be formed. In the mold press process, a outflow hole 155 is formed at an area in which the upper surface edge recess 131 may be formed.

Figure 7:
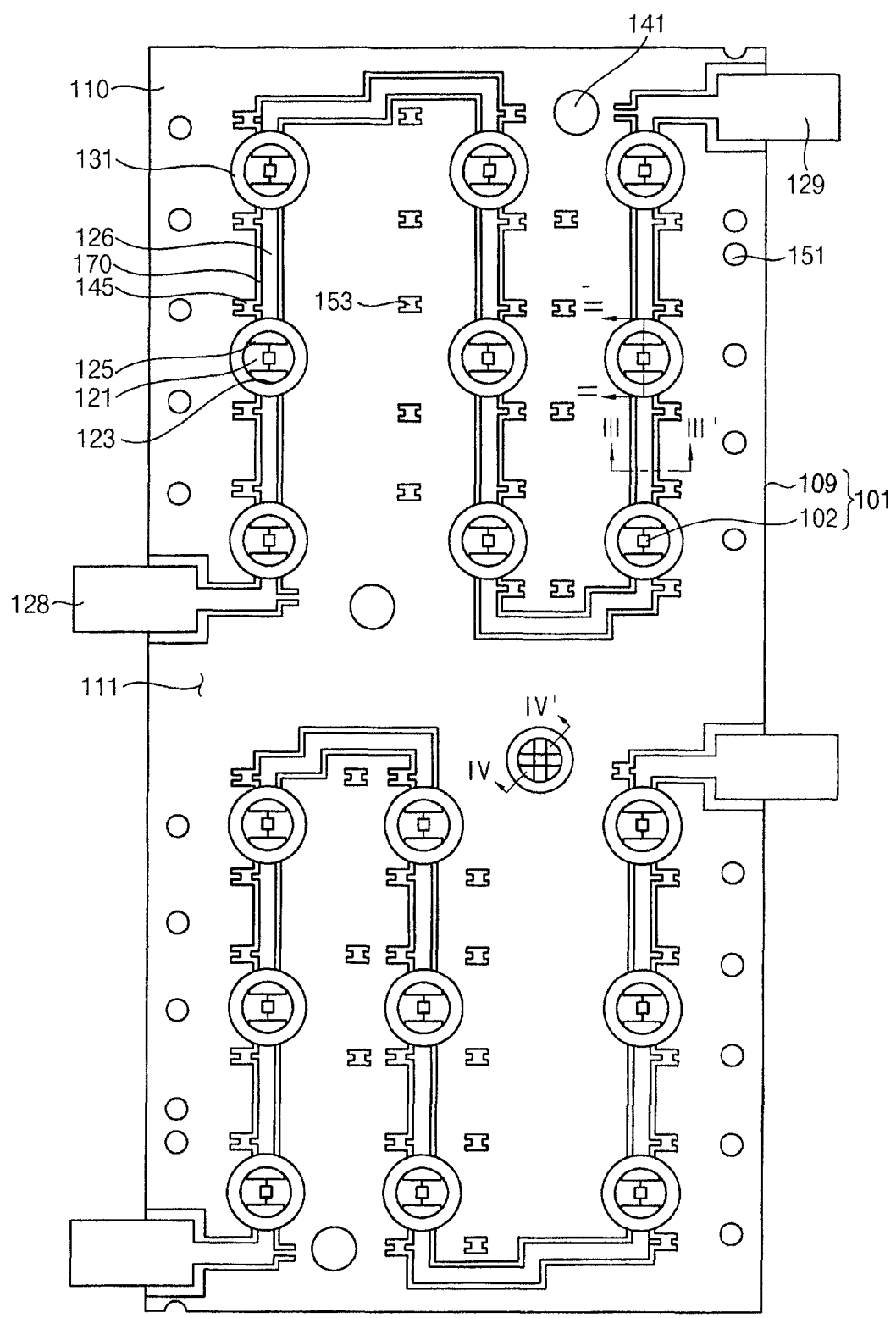
FIG. 7 is a front view of a light source module illustrating a state in which an insulation structure and a light source are combined with the frame plate illustrated in FIG. 4, in accordance with an embodiment of the present invention.
Figure 8:
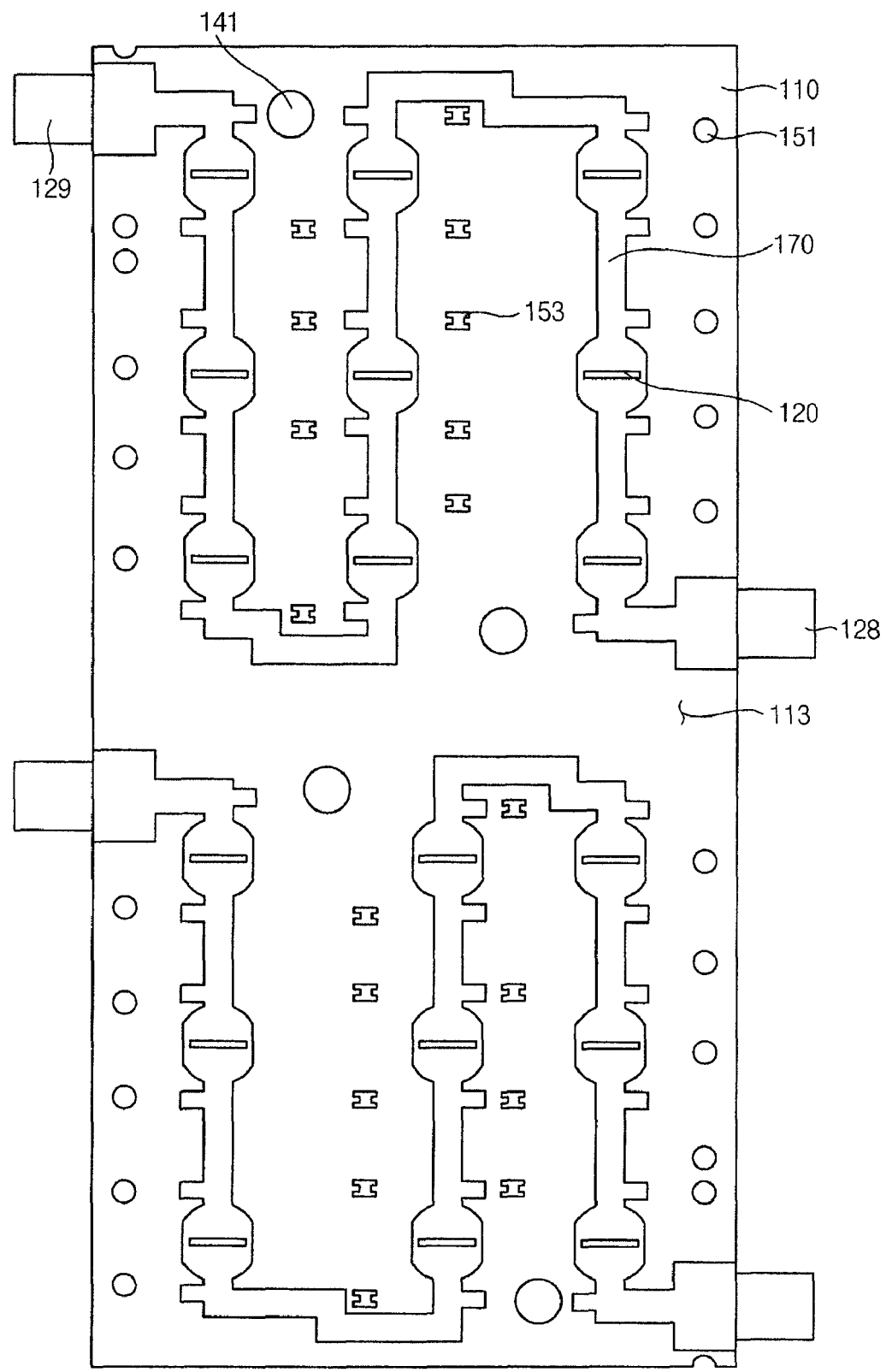
FIG. 8 is a rear view of the light source module illustrated in FIG. 7, in accordance with an embodiment of the present invention.

FIG. 7 is a front view of a light source module 101 illustrating a state in which an insulation structure 170 and a light source 102 are combined with the frame plate 110 illustrated in FIG. 4, in accordance with an embodiment of the present invention. FIG. 8 is a rear view of a light source module 101 illustrated in FIG. 7, in accordance with an embodiment of the present invention.

In one embodiment, an insulation structure 170 is formed in the boundary area 127 in which the frame plate 110 is open (block S30). The insulation structure 170 may fill up the boundary area 127 through an injection method. For example, the frame plate 110 may be disposed at an injector having an injection inlet formed thereon in correspondence with the boundary area 127, and then an insulation material fills up the boundary area 127 in a state in which the injection inlet is pressed against the lower surface 113 of the frame plate 110. Then, the insulation structure 170 may be formed by hardening the insulation material. The insulation structure 170 may include a plastic having superior insulating properties.

Figure 9:
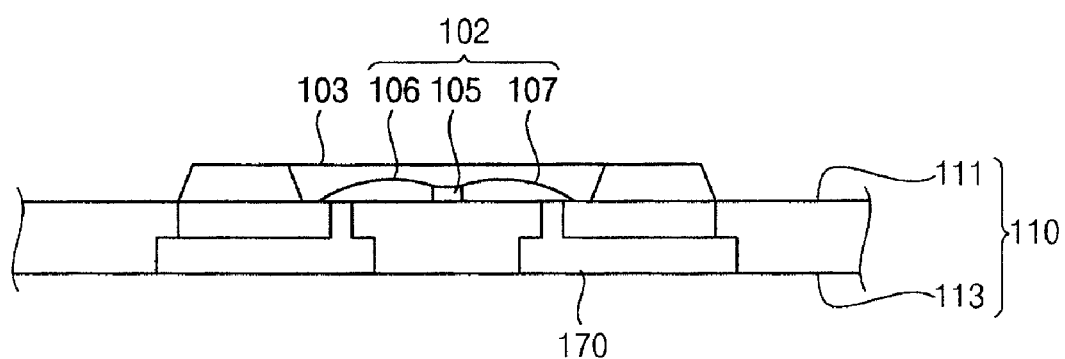
FIG. 9 is a cross-sectional view taken along a line II-II' of the light source module illustrated in FIG. 7, in accordance with an embodiment of the present invention.
Figure 10:
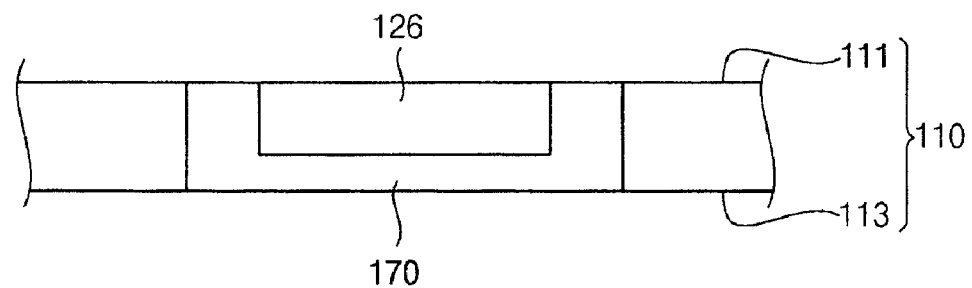
FIG. 10 is a cross-sectional view taken along a line III-III' of the light source module illustrated in FIG. 7, in accordance with an embodiment of the present invention.

FIG. 9 is a cross-sectional view taken along a line II-II' of a light source module 101 illustrated in FIG. 7, in accordance with an embodiment of the present invention. FIG. 10 is a cross-sectional view taken along a line III-III' of a light source module 101 illustrated in FIG. 7, in accordance with an embodiment of the present invention.

The insulation structure 170 may be extended to the upper surface edge recess 131 of the area surrounding the light source pad 121 through the boundary area 127 and the outflow hole 155, as shown in FIGS. 9 and 10. In one aspect, the insulation structure 170 shields a lower surface and a side surface of the power wiring portion 126 to electrically insulate from the frame plate 110.

Then, the supporting portion 122 connecting to the power wiring portion 126 and the frame plate 110 is removed to electrically insulate the power wiring portion 126 from the frame plate 110. The supporting portion 122 may be punched by a punching device (not shown) to be removed. A punching hole 145 is formed through the frame plate 110 through the punching process as shown in FIGS. 7 and 8. As the result of the punching process, a lead frame 109 may be manufactured, in which the frame plate 110 and the insulating structure 170 are combined with each other.

Continuously, as shown in FIG. 9, the light source 102 is connected to the first and second pads 123 and 125 of the power wiring portion 126. The light source 102 may include a light-emitting substance 105, and an input terminal 106 and an output terminal 107 that are connected to the light-emitting substance 105. The light-emitting substance 105 may include an LED chip. The LED chip may include a blue LED emitting blue light, a green LED emitting green light, and a red LED emitting red light. Alternatively, the LED chip may include a white LED emitting white light. The light-emitting substance 105 is attached to the light source pad 121. In one aspect, a heat radiating adhesive having electrical insulation properties and superior heat radiation may be interposed between the light source pad 121 and the light-emitting substance 105.

The input terminal 106 is connected to the first pad 123 disposed at the first side edge of the light source pad 121, and the output terminal 107 is connected to the second pad 125 disposed at the second side edge of the light source pad 121. For example, a bonding ball is interposed between the input terminal 106 and the first pad 123 and between the output terminal 107 and the second pad 125, and then heat and pressure are applied to the bonding ball in order to physically and chemically transform the bonding ball. Thus, the input terminal 106 and the first pad 123 may be electrically connected to each other, and the output terminal 107 and the second pad 125 may be electrically connected to each other.

Then, a cover part 103 covering the light source 102 may be formed. The cover part 103 is disposed in a space which is defined by the insulation structure formed at the upper surface edge recess 156 and the light source pad 121. The cover part 103 may include a resin material. In one example, the cover part 103 may include an optically transparent material. In another example, the cover part 103 may include a fluorescent substance, such as a yellow fluorescent substance or a red fluorescent substance.

As a result of the above-mentioned processes, the lead frame 109 and the light source 102 are combined with each other (block S40), so that the light source module 101 may be manufactured.

Figure 11:
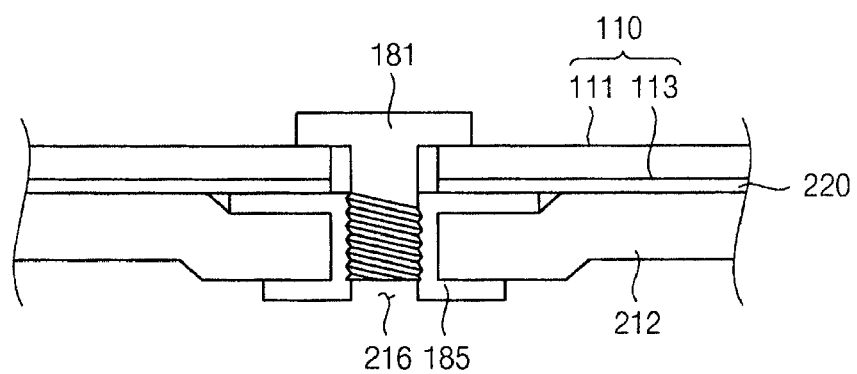
FIG. 11 is a cross-sectional view taken along a line IV-IV' of the light source module illustrated in FIG. 7, in accordance with an embodiment of the present invention.

FIG. 11 is a cross-sectional view taken along a line IV-IV' of a light source module 101 illustrated in FIG. 7, in accordance with an embodiment of the present invention.

Referring to FIG. 11, a screw hole 216 corresponding to the coupling hole 141 of the frame plate 110 is formed through the bottom plate 212 of the receiving container 210. As shown in FIG. 11, an insulation cap 185 is inserted into the screw hole 216 from a rear surface of the bottom plate 212, and then a coupling screw 181 is penetrated through the coupling hole 141, and the screw hole 216 to be combined with the insulation cap 185. In one aspect, the light source module 101 may be fixed to the bottom plate 212.

Figure 12:
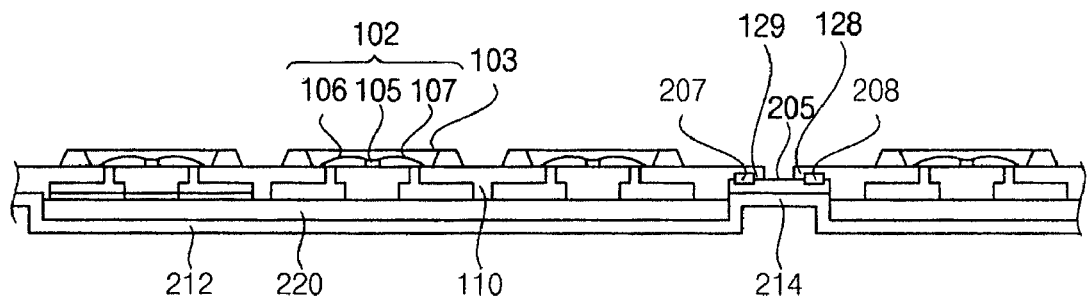
FIG. 12 is a cross-sectional view taken along a line V-V' of a light source module and the receiving container illustrated in FIG. 2, in accordance with an embodiment of the present invention.

FIG. 12 is a cross-sectional view taken along a line V-V' of a light source module 101 and a receiving container 210 illustrated in FIG. 2, in accordance with an embodiment of the present invention.

Referring to FIGS. 2 and 12, the backlight assembly 201 may include an insulation sheet 220. The insulation sheet 220 is disposed between the frame plate 110 and the bottom plate 212. The insulation sheet 220 may include a material having superior electrical insulation and heat radiation properties. The insulation sheet 220 electrically insulates the frame plate 110 from the bottom plate 212, and effectively transmits heat radiated from the light source 102 to the bottom plate 212. The heat radiating surface 120 is formed on the lower surface edge recess 154 of the lower surface 113 corresponding to the light source pad 121. The heat radiating surface 120 is not an etching area, and thus, the heat radiating surface 120 directly contacts the insulation sheet 220 so that heat radiation may be effectively performed. Alternatively, the insulation sheet 220 may be omitted, and the frame plate 110 may directly contact the bottom plate 212.

The backlight assembly 201 may include a power delivery substrate 205. The power delivery substrate 205 is disposed on a stepped portion 214 of the bottom plate 212. The power delivery substrate 205 has, as shown in FIG. 2, a power input line 236 and a power output line 238. As shown in FIG. 12, an input connection portion 208 is formed at the power input line 236, and an output connection portion 207 is formed at the power output line 238. The power input portion 128 formed at the frame plate 110 is extended over the power delivery substrate 205 to be electrically connected to the input connection portion 208. The power output portion 129 is extended over the power delivery substrate 205 to be electrically connected to the output connection portion 207.

Referring to FIG. 1, the backlight assembly 201 may include a converter 230, a side frame 240, optical sheets 260, and a middle frame 250. The converter 230 applies light driving power, for example, a driving current to the light source 102 through the power delivery substrate 205 based on a light source control signal applied from the driving board 275. The converter 230 may be electrically connected to a power connection connector 235 of the power delivery substrate 205, which is exposed through the bottom plate 212.

The side frame 240 is disposed at the first side wall 211 and the second side wall 213, respectively, to support the optical sheets 260. The optical sheets 260 may include a diffusion plate 261 and a light condensing sheet 265 that are sequentially stacked on the side frame 240. The middle frame 250 presses edges of the optical sheets 260 to be combined with the receiving container 210. The display panel 270 is disposed at a stepped portion formed at an inner side surface of the middle frame 250.

Conventionally, a frame member, which has a plurality of light-emitting substances arranged in order to manufacture a light-emitting substance, is discarded after cutting into light-emitting substance packages. However, according to the present embodiment, the frame plate 110 or the lead frame 109, which arrange the light-emitting substances 105, has a wiring structure for transmitting power, so that it may be not separated per the light-emitting substances. In one embodiment, the lead frame 109 may be replaced with a printed circuit board (PCB). Thus, the PCB may be omitted.

Moreover, a trimming process, which separates the light-emitting substance 105 combined with the frame plate 110 into packages may be omitted. Furthermore, a process, which disposes the light-emitting substance package on the PCB through a surface mounting technology (SMT) may be omitted.

Therefore, manufacturing costs and the number of manufacturing processes for the light source module 101 and the backlight assembly 201 may be reduced, and the volume and weight of the light source module 101 and the backlight assembly 201 may be reduced. Moreover, in the SMT process, heat is not applied to the light-emitting substance 105, so that the function of the light-emitting substances 105 may not be deteriorated, and the light module 101 may be configured.

Example Embodiment 2

Figure 13:
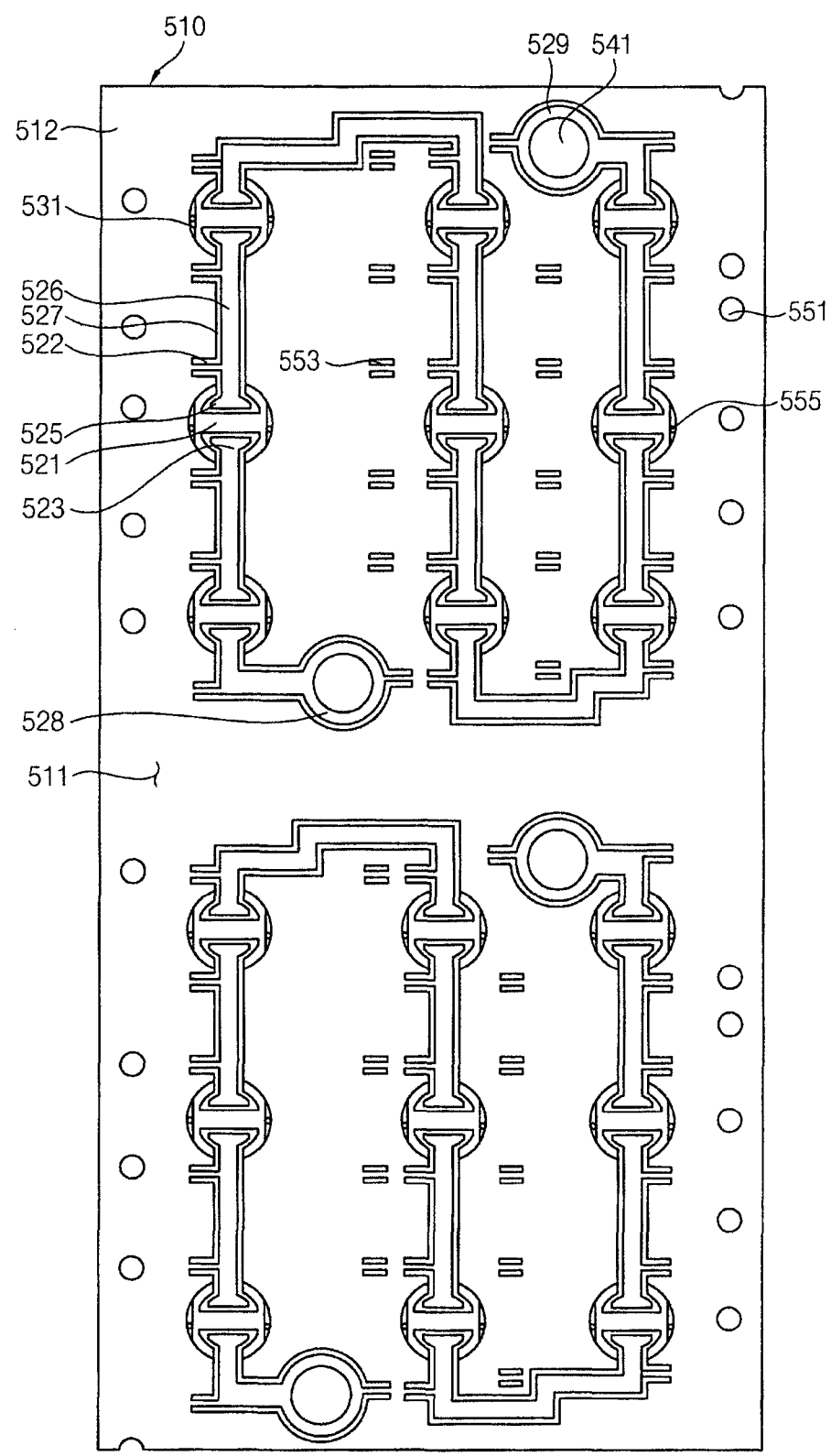
FIG. 13 is a front view illustrating a frame plate of a light source module according to Example Embodiment 2.
Figure 14:
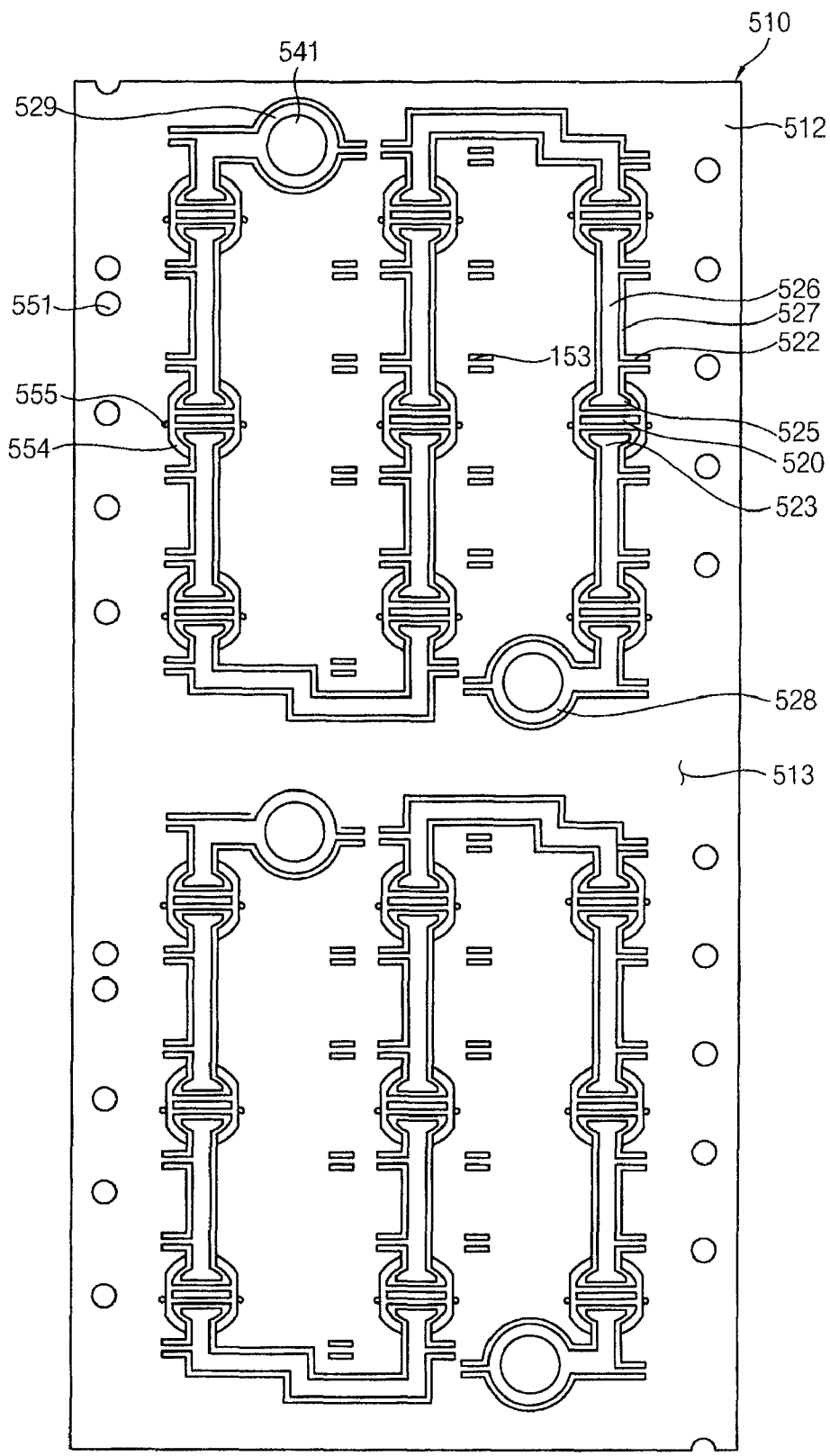
FIG. 14 is a rear view illustrating the frame plate illustrated in FIG. 13, in accordance with an embodiment of the present invention.

FIG. 13 is a front view illustrating a frame plate 510 of a light source module 501 according to an Example Embodiment 2. FIG. 14 is a rear view illustrating the frame plate 510 as illustrated in FIG. 13, in accordance with an embodiment of the present invention.

Referring to FIGS. 13 and 14, the light source module 501 of Example Embodiment 2 is substantially the same as the light source module 501 of FIGS. 1 to 12 except for the shapes of the power input portion 528 and the power output portion 529. Thus, identical reference numbers are used in FIG. 13 to refer to components that are the same as or similar to those shown in FIGS. 1 to 12, and thus a detailed description thereof will be omitted.

In the present embodiment, the boundary area 527 is connected to a coupling hole 541. The power input portion 528 and the power output portion 529 are extended from an input side power wiring portion 526 and an output side power wiring portion 526, so that an end portion is disposed at the coupling hole 541. A coupling hole is formed through the power input portion 528 and the power output portion 529, respectively.

Figure 15:
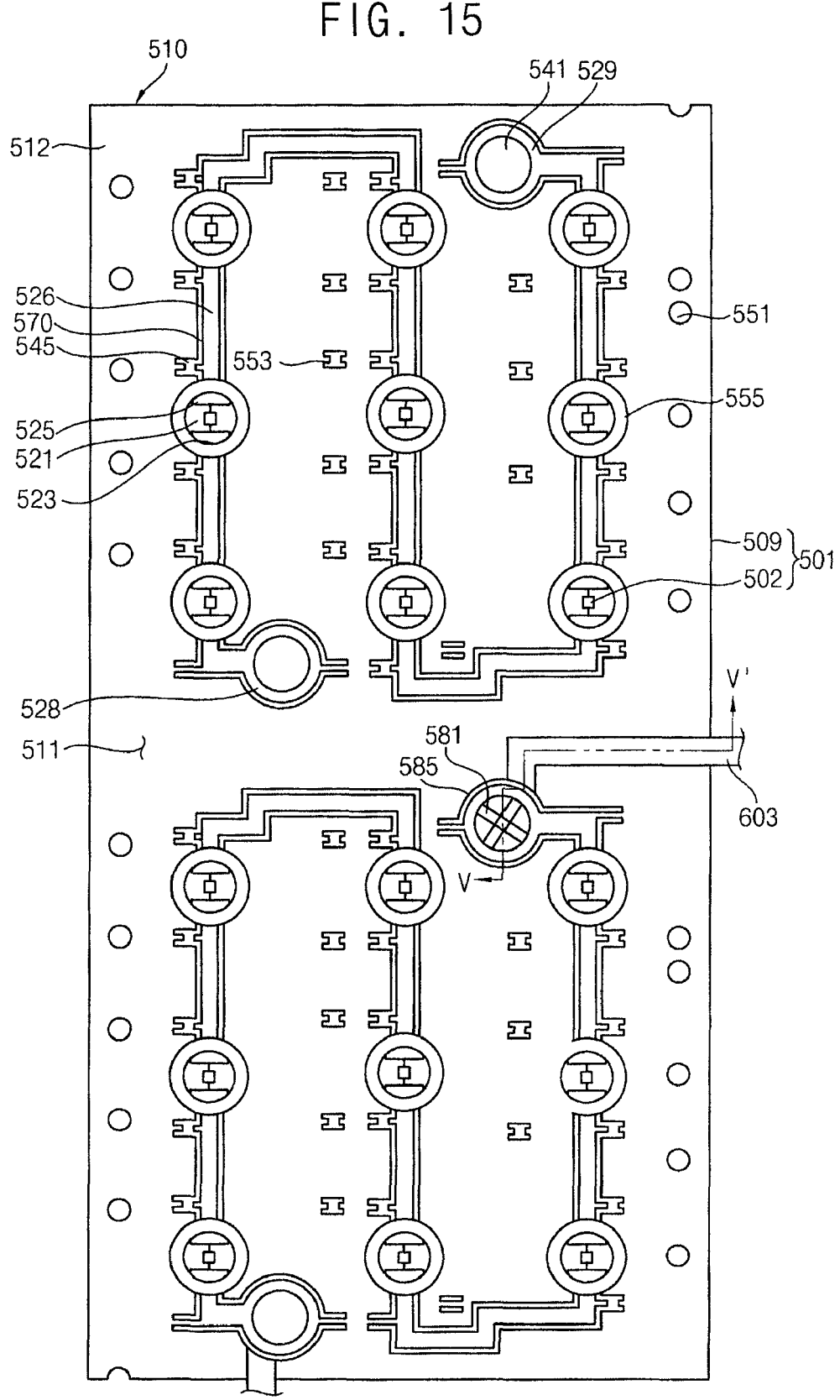
FIG. 15 is a front view of a light source module illustrating a state in which an insulation structure and a light-emitting substance are combined with the lead frame illustrated in FIG. 13, in accordance with an embodiment of the present invention.
Figure 16:
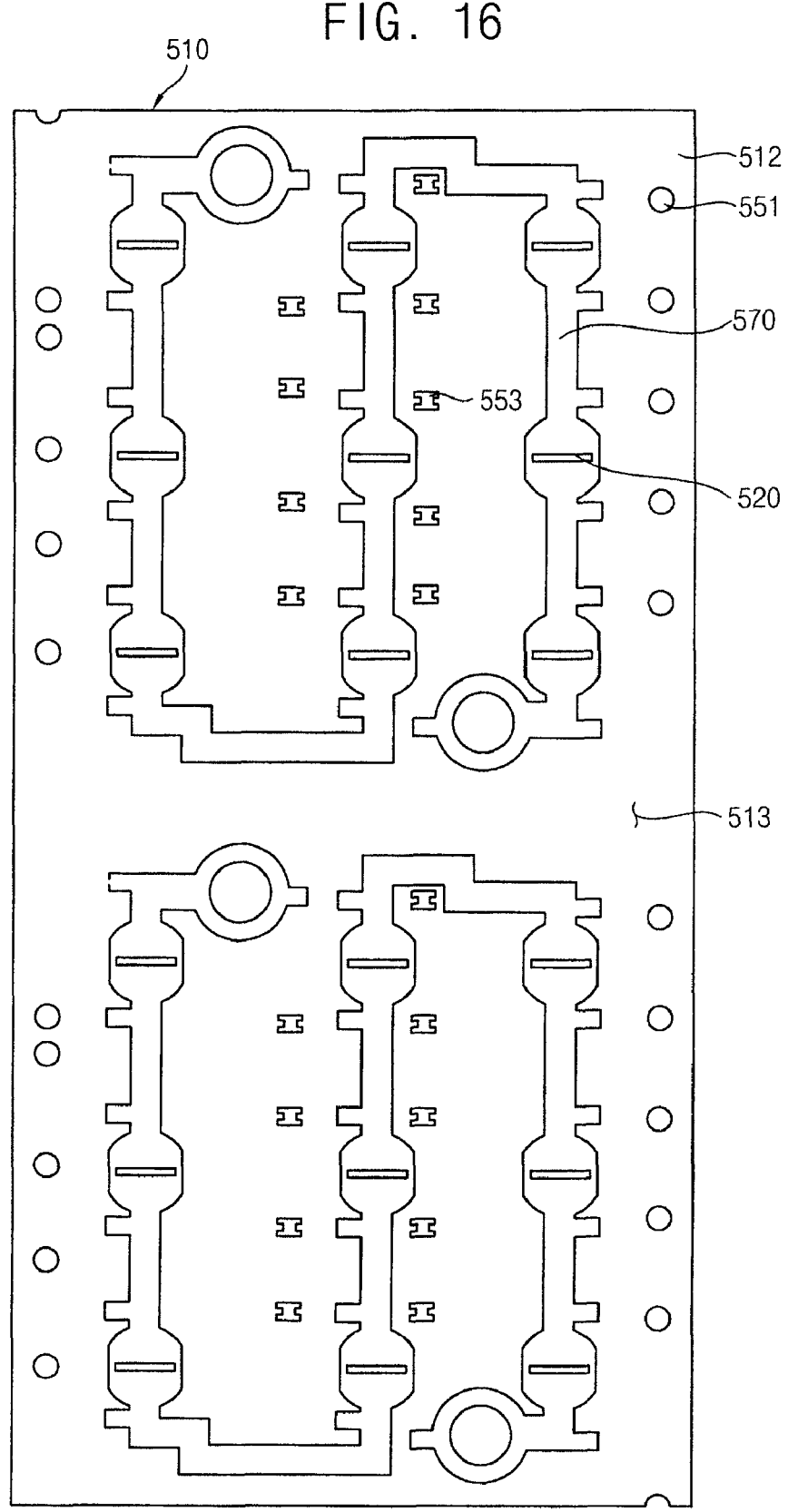
FIG. 16 is a rear view illustrating the light source module illustrated in FIG. 15, in accordance with an embodiment of the present invention.

FIG. 15 is a front view of a light source module 501 illustrating a state in which an insulation structure 570 and a light-emitting substance 105 are combined with the lead frame 510 illustrated in FIG. 13, in accordance with an embodiment of the present invention. FIG. 16 is a rear view illustrating a light source module 501 illustrated in FIG. 15, in accordance with an embodiment of the present invention.

Referring to FIGS. 15 and 16, the method of manufacturing the light source module 501 of the present embodiment is substantially the same as the method of manufacturing the light source module 501 of FIGS. 1 to 12 except that the boundary area 527 and the insulation structure 570 are extended to the coupling hole 541.

An insulation structure 570 is injected in the boundary area 527 and the coupling hole 541 of the frame plate 510 to form a lead frame 509. The insulation structure 570 may include a plastic injection molding material. The insulation structure 570 is extended to the coupling hole 541 to electrically insulate the power input portion 528 and the power output portion 529 from the frame plate 510.

Figure 17:
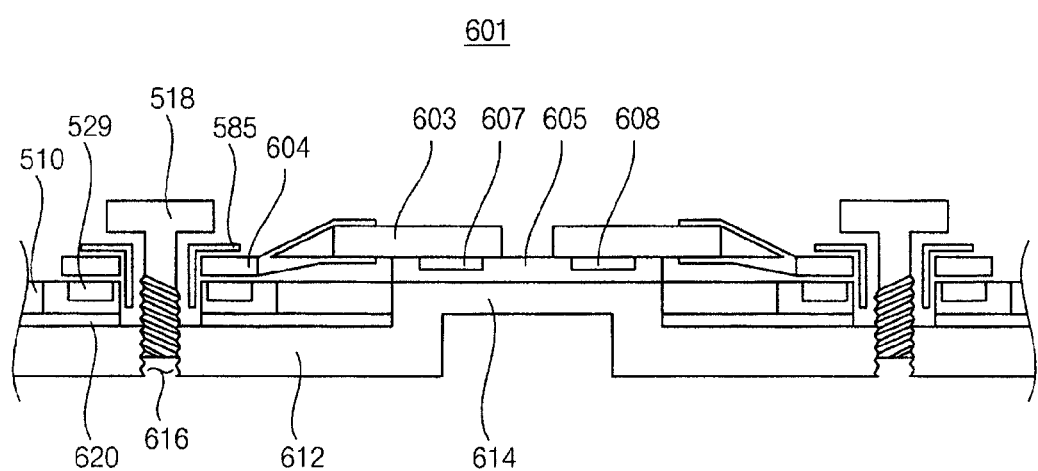
FIG. 17 is a cross-sectional view taken along a line VI-VI' of the light source module illustrated in FIG. 15, in accordance with an embodiment of the present invention.

FIG. 17 is a cross-sectional view taken along a line VI-VI' of a light source module 501 illustrated in FIG. 15, in accordance with an embodiment of the present invention.

Referring to FIG. 17, the backlight assembly 601 of the present embodiment is substantially the same as the backlight assembly 201 of FIGS. 1 to 12 except that the backlight assembly 601 includes a light source module 501 of FIGS. 13 to 16 and a connecting type of a line for providing the light source module 501 with power.

In the present embodiment, the coupling hole 541 is disposed in correspondence with a screw hole 616 of a bottom plate 612 of a receiving container. In one aspect, a connection terminal 604 connected to the power supply wiring 603 is arranged on the coupling hole 541. As shown in FIG. 17, an insulation cap 585 is penetrated through the connection terminal 604 from an upper surface of the bottom plate 612 to be inserted through the coupling hole 541. Then, a coupling screw 581 is penetrated through the coupling hole 541 and the screw hole 616 through the insulation cap 585 to be combined with the bottom plate 612. Thus, the light source module 501 is fixed to the bottom plate 612. The power output portion 529 or the power input portion 528 is electrically connected to the power supply wiring 603 through the above method. The power supply wiring 603 may be electrically connected to an input connection portion 608 or an output connection portion 607 that is disposed on the stepped portion 614 of the receiving container. Alternatively, the power supply wiring 603 may be directly outputted toward an external side of the receiving container to be electrically connected to a converter.

According to the light source module 501, a method of manufacturing the light source module 501, and the backlight assembly 601 having the light source module 501 in accordance with Example Embodiment 2, the power supply wiring 603 may be electrically connected to the light source module 501 through a screw fixing the light source module 501 to the bottom plate 612. In one aspect, the power input portion 528 and the power output portion 529 are not protruded from an edge of the frame plate 510, different than Example Embodiment 1, so that operating the light source may be simplified.

Example Embodiment 3

Figure 18:
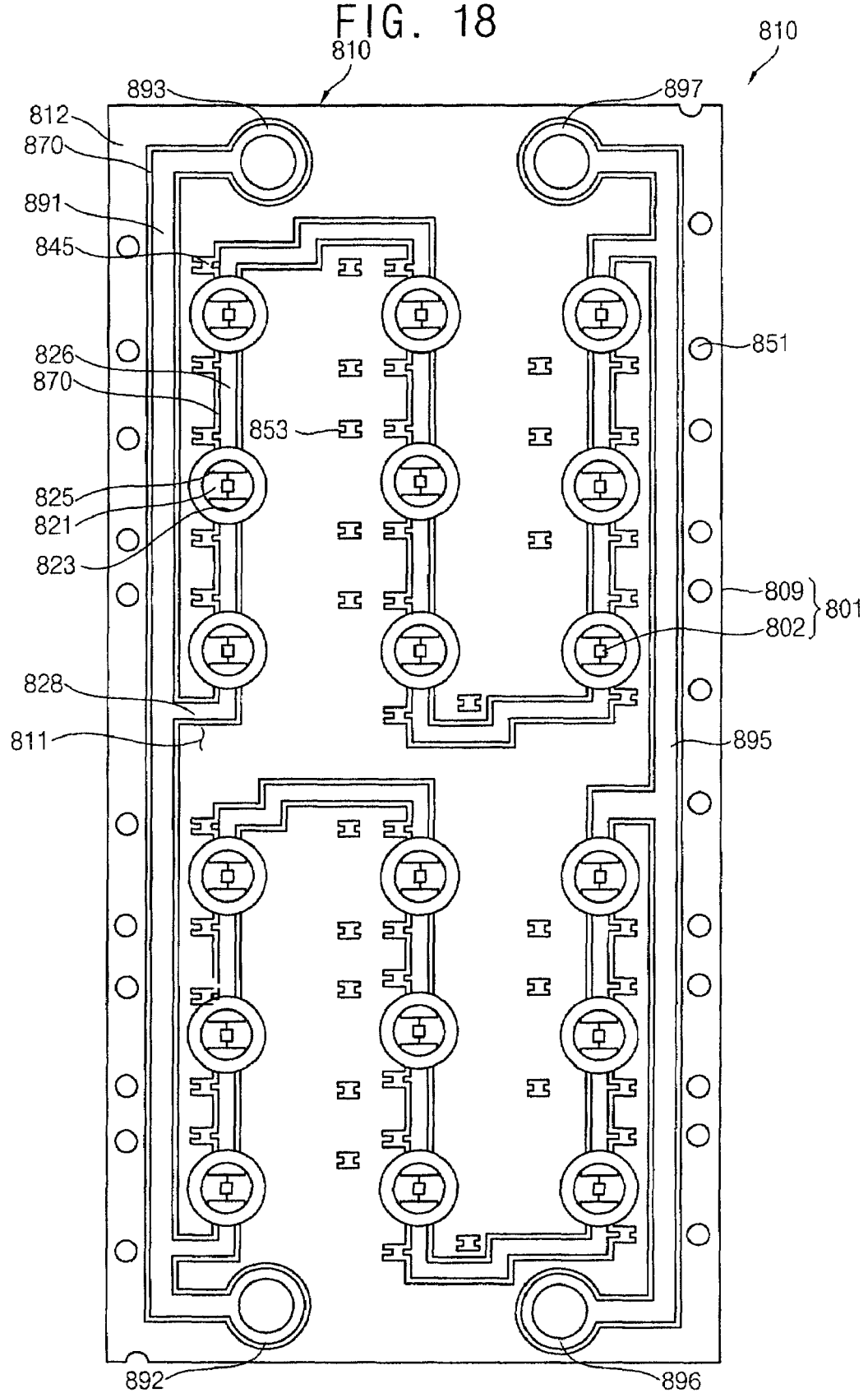
FIG. 18 is a front view illustrating a light source module according to Example Embodiment 3.

FIG. 18 is a front view illustrating a light source module 801 according to an Example Embodiment 3. Referring to FIG. 18, the light source module 801 of Embodiment 3 is substantially the same as the light source module 501 of FIGS. 1 to 12 except that an input power wiring portion 891 and an output power wiring portion 895 are formed on a frame plate 810 and the shapes of a power input portion 828 and a power output portion 829. Thus, identical reference numbers are used in FIG. 18 to refer to components that are the same as or similar to those shown in FIGS. 1 to 12, and thus a detailed description thereof will be omitted.

In the present embodiment, a straight type boundary area 827 is formed at two edges of the lateral direction 'y' of the frame plate 810, and the input power wiring portion 891 and the output power wiring portion 895 are formed, respectively, at the boundary area 827 corresponding to the edge. The insulation structure 870 is formed at the boundary area 827 to electrically insulate the input power wiring portion 891 and the output power wiring portion 895.

In the present embodiment, the power input portion 828 and the power output portion 829, which provide power to the light sources 802 that are serially connected with each other, are directly connected to the input power wiring portion 891 and the output power wiring portion 895, respectively. Two groups having the light sources 802 that are serially connected with each other may be connected in parallel to each other by the input power wiring portion 891 and the output power wiring portion 895. The power supply wiring may be connected to connection terminals 892, 893, 896 and 897 formed at end portions of the input power wiring portion 891 and the output power wiring portion 895, respectively, to be performed a power supply operation.

A method of manufacturing the light source module 801 of the present embodiment is substantially the same as the method of manufacturing the light source module 801 of FIGS. 3 to 12 except that the input power wiring portion 891 and the output power wiring portion 895 are further formed. Thus, a detailed description thereof will be omitted.

A backlight assembly of the present embodiment is substantially the same as the backlight assembly 201 of FIGS. 1 to 12 except that the light source module 801 is included in the backlight assembly. Thus, a detailed description thereof will be omitted.

According to the light source module 801, a method of manufacturing the light source module 801, and the backlight assembly having the light source module 801 in accordance with Example Embodiment 3, the lead frame 809 includes the input power wiring portion 891 and the output power wiring portion 895 that provide power to the light source 802, so that a wiring structure for power connection may be simplified.

According to the light source module, a method of manufacturing the light source module, and the backlight assembly having the light source module in accordance with embodiments, a PCB may be omitted, so that the volume, weight, and manufacturing costs of the light source module may be reduced. Moreover, a process of individually packaging light sources such as an LED may be omitted, so that manufacturing efficiency may be enhanced. Therefore, embodiments of the present invention may be utilized in a field using a point light source, such as LED.

The foregoing is illustrative of embodiments of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of embodiments of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A light source module comprising:
    a light source;
    a frame plate comprising:
        a plurality of light source pad portions having the light source disposed thereon;
        a power wiring portion electrically connected to the light source and formed in the vicinity of the light source pad portion; and
        a peripheral portion, which is a remaining portion excluding the light source pad portion and the power wiring portion,
        wherein a boundary area of the power wiring portion corresponding to the peripheral portion and the light source pad portion is formed to be open, so that the power wiring portion is spaced apart from the peripheral portion and the light source pad portion; and
    an insulation structure formed in the boundary area, wherein the insulation structure electrically insulates the power wiring portion from the frame plate.

2. The light source module of claim 1, wherein the frame plate comprises a conductive plate.

3. The light source module of claim 2, wherein the insulation structure is a plastic injection molding material which is injected in the boundary area, and wherein the plastic injection molding material penetrates through a first surface of the frame plate and a second surface opposite to the first surface.

4. The light source module of claim 3, wherein a portion of the power wiring portion is removed in a thickness direction to have a smaller thickness than that of the peripheral portion, and wherein the insulation structure surrounds the power wiring portion and is formed to be level with respect to the peripheral portion.

5. The light source module of claim 4, wherein the light source pad is formed on the first surface and a heat radiating surface exposed by the insulation structure is formed on the second surface.

6. The light source module of claim 2, wherein the light source comprises at least one light-emitting diode (LED), and wherein a plurality of the LEDs are grouped into at least one group, and wherein each group of the LEDs are electrically connected to each other by the power wiring portions.

7. The light source module of claim 6, wherein a power input portion and a power output portion are formed at an input side power wiring portion and an output side power wiring portion of each of the groups, respectively.

8. The light source module of claim 6, wherein a plurality of coupling holes are formed through the frame plate, and wherein an input pad exposing the coupling hole is formed through an end portion of the input side power wiring portion of each of the groups extended to the coupling hole, and wherein an output pad exposing the coupling hole is formed through an end portion of the output side power wiring portion of each of the groups extended to the coupling hole.

9. A backlight assembly comprising:
    a light source;
    a frame plate comprising:
        a plurality of light source pad portions having the light source disposed thereon;
        a power wiring portion having a first side end portion disposed adjacent to a first side edge of the light source pad portion and a second side end portion disposed adjacent to a second side edge of the light source pad portion; and a peripheral portion, which is a remaining portion excluding the light source pad portion and the power wiring portion, wherein a boundary area of the power wiring portion corresponding to the peripheral portion and the light source pad portion is formed to be open, so that the power wiring portion is spaced apart from the peripheral portion and the light source pad portion;

a light source module comprising an insulation structure that penetrates first and second surfaces of the frame plate and is inserted through the boundary area that is open, the insulation structure electrically insulating the power wiring portion from the frame plate; and a receiving container comprising a bottom plate opposite to the second surface to receive the light source module.

10. The backlight assembly of claim 9, further comprising an insulation sheet disposed between the bottom plate and the second surface of the frame plate to radiate heat generated from the light source and to insulate the frame plate from the bottom plate, wherein the light source pad is formed on the first surface, and wherein a heat radiating surface, which is exposed by the insulation structure to contact the insulation sheet, is formed on the second surface corresponding to the light source pad.

11. The backlight assembly of claim 10, wherein the light source comprises at least one LED, and wherein a plurality of the LEDs are grouped into at least one group, and wherein each group of the LEDs is serially connected to each other by the power wiring portions, and wherein the light source modules are arranged on the bottom plate.

12. The backlight assembly of claim 11, further comprising a power delivery substrate electrically connecting to a converter providing the light source with driving power and the light source module, wherein the power delivery substrate is disposed on a bottom plate between the light source modules.

13. The backlight assembly of claim 12, wherein the bottom plate is divided into a plurality of receiving areas where each of the light source modules is disposed, and wherein the bottom plate between the receiving areas is protruded toward an upper side to form a stepped portion, and wherein the power delivery substrate is disposed on an upper surface of the stepped portion.

14. The backlight assembly of claim 13, wherein a power input portion and a power output portion that are protruded from an edge of the frame plate are formed in an input side power wiring portion of each of the groups and an output side wiring portion of each of the groups, respectively, and wherein the power input portion and the power output portion are extended over the power delivery substrate to be electrically connected to a power connection terminal of the power delivery substrate.

15. The backlight assembly of claim 13, wherein a plurality of coupling holes through which a coupling member coupled with the bottom plate is inserted is formed through the frame plate, and wherein each end portion of the input side power input portion and the output side power output portion is extended to the coupling hole, and wherein the backlight assembly comprises a power connection wiring being pressed by the coupling member to contact the end portions so that the power connection wiring electrically connects to the power delivery substrate and the light source module.

16. A method of manufacturing a light source module, the method comprising:

forming a boundary area to be open between a power wiring area and a peripheral area that are defined on a conductive plate to form a frame plate in which a power wiring portion corresponding to the power wiring area is spaced apart from a peripheral portion corresponding to the peripheral area;

forming an insulation structure on the open boundary area; and mounting a light source on the frame plate to be electrically connected to the frame plate and the power wiring portion.

17. The method of claim 16, further comprising forming a light source pad portion being electrically insulated from the power wiring portion on the conductive plate, wherein the light source pad portion has the light source disposed thereon.

18. The method of claim 17, wherein forming the insulation structure comprises:

disposing the conductive plate at an injector; and filling up the boundary area with a plastic injection molding material and hardening the plastic injection molding material.

19. The method of claim 18, further comprising removing a supporting portion connecting the power wiring portion and the conductive plate after forming the insulation structure.

20. The method of claim 17, wherein mounting of the light source on the frame plate comprises:

disposing a light-emitting substance on the light source pad; and electrically connecting end portions of the power wiring portions formed in the vicinity of the light source pad to an input terminal and output terminal of the light-emitting substance.

* * * * *